United States Patent
Matsumoto

(10) Patent No.: US 8,969,818 B2
(45) Date of Patent: Mar. 3, 2015

(54) RADIATION IMAGING APPARATUS

(71) Applicant: Canon Kabushiki Kaisha, Tokyo (JP)

(72) Inventor: Kazuhiro Matsumoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/948,886

(22) Filed: Jul. 23, 2013

(65) Prior Publication Data

US 2014/0027647 A1    Jan. 30, 2014

(30) Foreign Application Priority Data

Jul. 25, 2012  (JP) ................. 2012-164983

(51) Int. Cl.
*G01T 1/20*   (2006.01)
(52) U.S. Cl.
CPC ............. *G01T 1/2006* (2013.01); *G01T 1/2018* (2013.01)
USPC ....................................................... 250/366
(58) Field of Classification Search
CPC ...... A61B 6/4283; G01T 1/2002; G01T 1/24; G01T 1/20
USPC ........................................................ 250/366
See application file for complete search history.

(56) References Cited

U.S. PATENT DOCUMENTS

| | | | | |
|---|---|---|---|---|
| 4,663,774 A | * | 5/1987 | Saffer | ........................... 378/154 |
| 5,777,335 A | * | 7/1998 | Mochizuki et al. | ...... 250/370.09 |
| 6,667,480 B2 | * | 12/2003 | Kajiwara et al. | ......... 250/370.01 |
| 2002/0005490 A1 | * | 1/2002 | Watanabe | ............... 250/370.09 |
| 2002/0145117 A1 | * | 10/2002 | Mochizuki | .............. 250/370.09 |

FOREIGN PATENT DOCUMENTS

| | | |
|---|---|---|
| JP | 2002267758 A | 9/2002 |
| JP | 3880094 A | 2/2007 |
| JP | 2008002987 A | 1/2008 |
| JP | 4497663 B2 | 7/2010 |

* cited by examiner

*Primary Examiner* — Marcus Taningco
(74) *Attorney, Agent, or Firm* — Canon USA Inc. IP Division

(57) ABSTRACT

A radiation imaging apparatus includes a radiation image detection unit including a flexible substrate, photoelectric conversion elements arranged on the substrate, and a phosphor member disposed on an upper part of the substrate, a housing accommodating the radiation image detection unit, and a support member having the substrate disposed along a side surface for non-radiation transmission in the housing from a surface for radiation transmission in the housing.

8 Claims, 7 Drawing Sheets

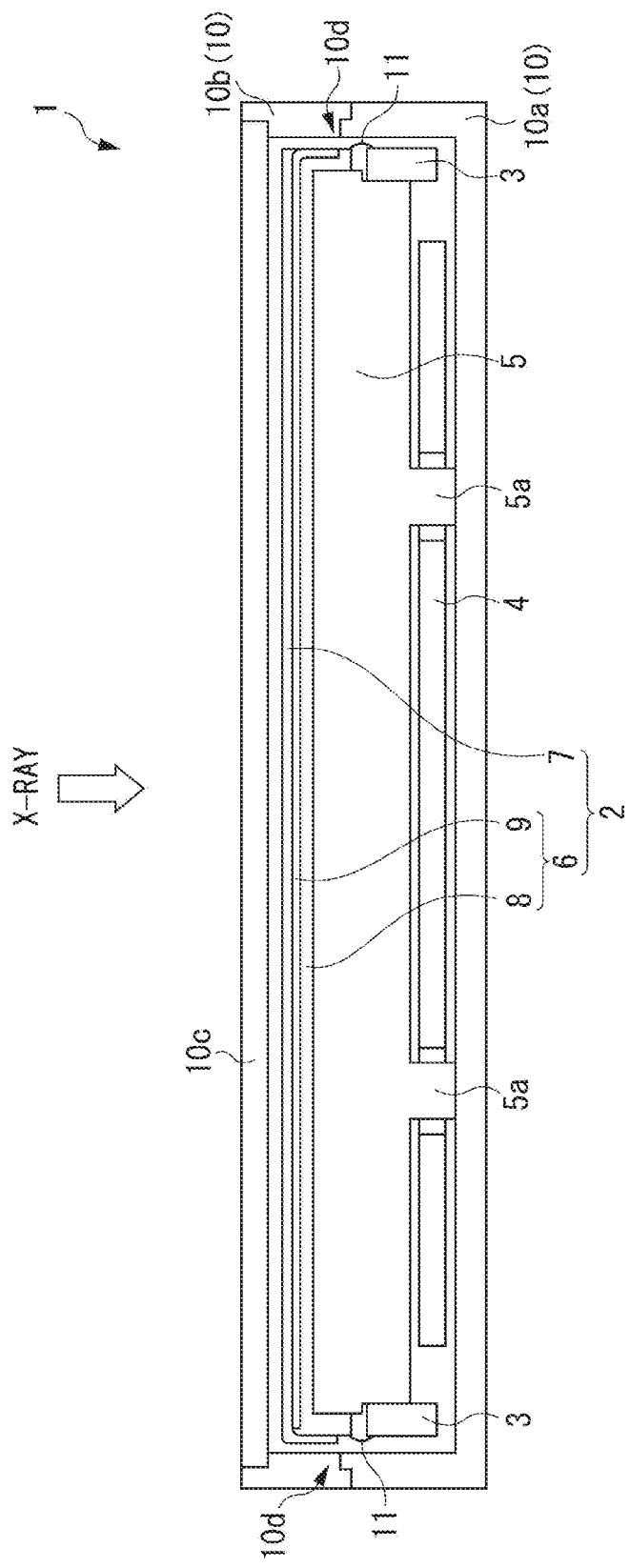

RADIATION IMAGING APPARATUS

BACKGROUND OF THE INVENTION

1. Field of the Invention

The present invention relates to a radiation imaging apparatus.

2. Description of the Related Art

There is known a radiation imaging apparatus configured to capture a radiation image based on detection of radiation (for example, X-ray) transmitted through a subject. For example, a digital radiation imaging apparatus including an X-ray phosphor member and a photodetector has advantages such as their good image characteristics and their ability to share image data, which is digital data, in networked computer systems. There is known as the digital radiation imaging apparatus an imaging apparatus including a solid detector in which a phosphor member configured to convert radiation into visible light is stuck on a radiation image detector. In the radiation image detector, a plurality of photoelectric conversion elements including thin film transistors are two-dimensionally arranged.

In the imaging apparatus, as discussed in Japanese Patent Application Laid-Open No. 2002-267758, a drive processing circuit substrate configured to drive an X-ray image detector and a signal processing circuit substrate configured to process output from the X-ray image detector, are disposed on a back surface side and side surface part of a support member having a surface side with the X-ray image detector placed thereon. These circuit substrates and the X-ray image detector are connected via a flexible wiring substrate. In Japanese Patent No. 3880094, a substrate having photoelectric conversion elements and an end face of a phosphor sheet are sealed with a sealing member.

In Japanese Patent Application Laid-Open No. 2008-002987, an imaging apparatus suitable for a mammography apparatus includes a cassette accommodating an image recording plate including a recording layer in which a radiation image is accumulated and recorded. An end face of a portion including the recording layer in the image recording plate is disposed in a dent of a side wall of the cassette.

Japanese Patent No. 4497663 considers protection of a radiation image detection panel from dropping and impact of an imaging apparatus.

Even if radiation is irradiated to a portion between an outer periphery of a range in which the photoelectric conversion elements and phosphor member of the radiation image detector accommodated in a housing of the radiation imaging apparatus overlap each other (a range in which radiation can be detected) and a side surface of the housing, the radiation image cannot be detected. Herein, the range in which the radiation can be detected is referred to as a sensor portion. The portion between the outer periphery of the range in which the radiation can be detected and the side surface of the housing is referred to as a non-sensor portion. Generally, in the radiation imaging apparatus, particularly the mammography apparatus, it is an important issue to reduce the non-sensor portion to minimize a defect in the radiation image. In the imaging apparatus of Japanese Patent Application Laid-Open No. 2002-267758, a connection electrode is provided on the outer periphery of the surface of the radiation image detector to connect the flexible wiring substrate to the radiation image detector. Therefore, the photoelectric conversion elements cannot be disposed to extend to the outer peripheral end of the radiation image detector. Furthermore, because the flexible wiring substrate is disposed on the outside of the outer shape of the radiation image detector, the sensor portion cannot be brought close to the side surface of the housing of the imaging apparatus.

Because the sealing agent exists on the substrate having the photoelectric conversion elements and the end face of the phosphor sheet in the imaging apparatus discussed in Japanese Patent No. 3880094, the sensor portion cannot be brought close to the side surface of the housing of the imaging apparatus. In the imaging apparatus discussed in Japanese Patent Application Laid-Open No. 2008-002987, only a small gap exists between the radiation image detector and the side wall of the cassette. Therefore, when a fragile substrate such as a glass plate is used as the image recording plate, breakage of the radiation image detector caused by contact or collision to the side wall of the cassette cannot be sufficiently prevented.

Since a buffer means is disposed between a base having a surface having the radiation detection panel disposed thereon and the side wall of the housing in the imaging apparatus discussed in Japanese Patent No. 4497663, the sensor portion cannot be brought close to the side surface of the housing of the imaging apparatus.

SUMMARY OF THE INVENTION

The present invention is directed to a radiation imaging apparatus capable of preventing breakage of a radiation image detector and reducing defects in a radiation image captured by the radiation imaging apparatus such as a mammography apparatus.

According to an aspect of the present invention, a radiation imaging apparatus includes: a radiation image detection unit including a flexible substrate, a photoelectric conversion elements arranged on the substrate, and a phosphor member disposed on an upper part of the substrate; a housing accommodating the radiation image detection unit; and a support member having the substrate disposed along a side surface for non-radiation transmission in the housing from a surface for radiation transmission in the housing.

Further features of the present invention will become apparent from the following description of exemplary embodiments (with reference to the attached drawings).

BRIEF DESCRIPTION OF THE DRAWINGS

FIG. 5 is a sectional view illustrating an example of an X-ray imaging apparatus of another exemplary embodiment.

DESCRIPTION OF THE EMBODIMENTS

Exemplary embodiments according to the present invention will now be described in detail with reference to the drawings. The following exemplary embodiments will exemplify cases in which X-rays are used as radiation. However, the radiation is not limited to the X-rays but may be electromagnetic waves, α-rays, β-rays, or γ-rays. The following exemplary embodiments will exemplify an X-ray imaging apparatus as a radiation imaging apparatus.

Figure 1:
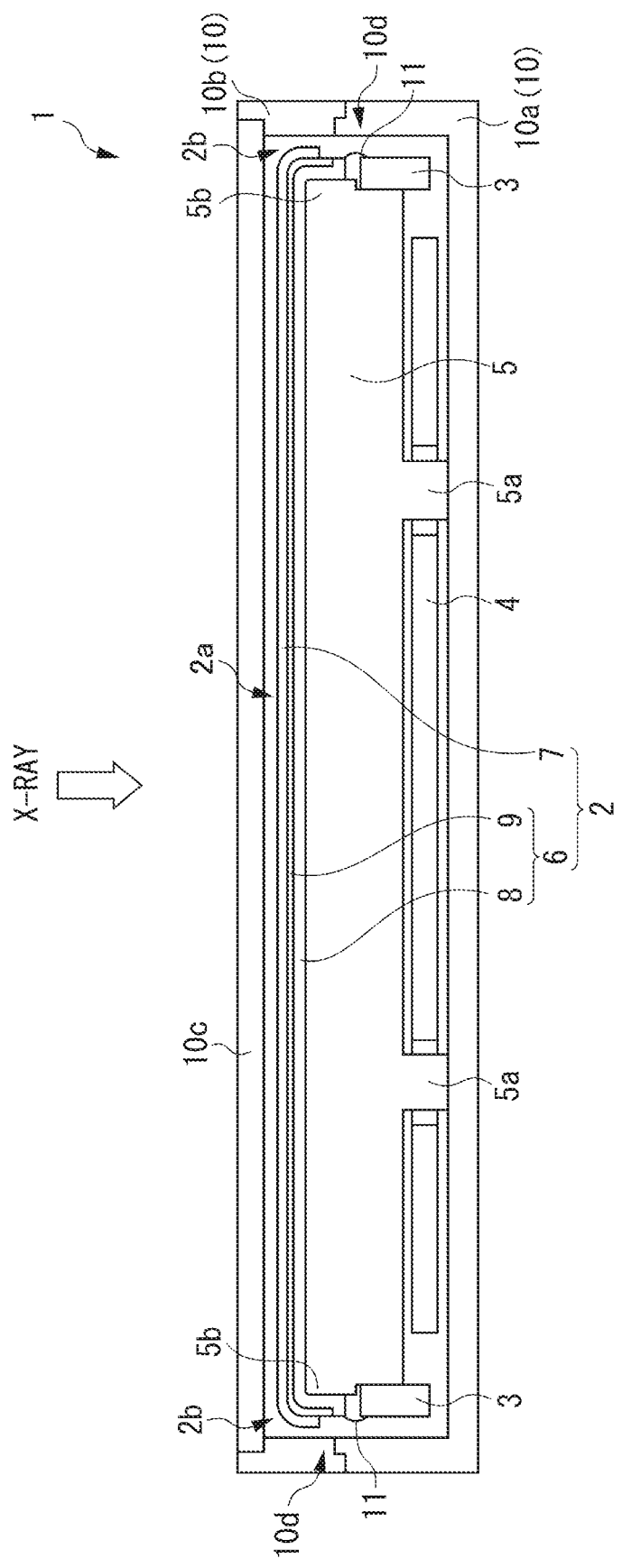
FIG. 1 is a sectional view of illustrating an example of an X-ray imaging apparatus according to a first exemplary embodiment.

FIG. 1 is a sectional view illustrating an example of an X-ray imaging apparatus 1.

The X-ray imaging apparatus 1 includes an X-ray image detector 2, a drive processing circuit substrate 3 configured to drive the X-ray image detector 2, a signal processing circuit substrate 4 configured to process an image signal output from the X-ray image detector 2, and a support member 5 configured to support and fix the above-described components, and made of metal.

The X-ray image detector (radiation image detector) 2 is an example of a radiation image detection unit, and includes a photoelectric conversion substrate 6 and a phosphor member 7 configured to convert X rays into visible light. In the X-ray image detector 2, the phosphor member 7 is stuck on the upper part of the photoelectric conversion substrate 6. The photoelectric conversion substrate 6 includes a flexible substrate 8 and photoelectric conversion elements 9 formed on the substrate 8. A plurality of photoelectric conversion elements 9 are two-dimensionally arranged substantially at equal distances on the surface of the substrate 8. The phosphor member 7 converts a distribution of X rays transmitted via a subject or an X-ray image to a visible light distribution or a visible light image. The photoelectric conversion elements 9 performs photoelectric conversion to convert the visible light distribution or the visible light image into electric charges or electric signals.

On the other hand, a housing 10 of the X-ray imaging apparatus 1 includes a lower housing 10a for non-radiation transmission, and an upper housing 10b for non-radiation transmission. The housing 10 accommodates the X-ray image detector 2. A housing lid 10c made of a material having high X-ray transmission is integrally fixed to the upper housing 10b by adhesion. Carbon fiber reinforced plastic (CFRP) is used for the housing lid 10c for radiation transmission. The support member 5 as an example of a support member is disposed on the lower housing 10a. A leg part 5a of the support member 5 is fixed to the lower housing 10a by a fastening member such as a screw.

The support member 5 has a shape such that a central part 2a of the X-ray image detector 2 is supported so as to be substantially parallel to the housing lid 10c, an end part 2b of the X-ray image detector 2 is supported near a side surface 10d for non-radiation transmission in the housing 10, and the end part 2b is supported in a direction substantially perpendicular to the housing lid 10c. Therefore, the substrate 8 is continuously disposed along the side surface 10d of the housing 10 from a surface substantially parallel to the housing lid 10c.

Herein, in the present exemplary embodiment, the X-ray image detector 2 including the substrate 8 is continuously disposed along the side surface 10d of the housing 10 from the surface substantially parallel to the housing lid 10c to which radiation is irradiated.

Herein, the X-ray image detector 2 is supported so as to follow the R shape of a corner part 5b of the support member 5 having a predetermined radius between the central part 2a and the end part 2b of the X-ray image detector 2. Therefore, the photoelectric conversion substrate 6, i.e., the substrate 8 and the photoelectric conversion elements 9, and the phosphor member 7 are also continuously disposed along the side surface 10d of the housing 10 from the surface substantially parallel to the housing lid 10c so as to follow the R shape.

The support member 5 supports the drive processing circuit substrate 3 in a direction substantially perpendicular to the detection surface of the X-ray image detector 2. The support member 5 supports the signal processing circuit substrate 4 so as to be substantially parallel to the detection surface of the X-ray image detector 2 on the back surface side of the support member 5. The X-ray image detector 2 and the drive processing circuit substrate 3 are connected by a flexible wiring substrate 11 as an example of a connection unit. Herein, the wiring substrate 11 is connected to the end part of the substrate 8 of the X-ray image detector 2. The X-ray image detector 2, the drive processing circuit substrate 3, and the signal processing circuit substrate 4 are fixed to the support member 5, and the support member 5 is then disposed in the upper housing 10b. The lower housing 10a is connected to the upper housing 10b and the leg part 5a, to complete the X-ray imaging apparatus 1. According to the present exemplary embodiment, the flexible substrate 8 is formed into a convex shape with respect to an X-ray incident surface. However, the flexible substrate 8 may be formed into a concave shape. The convex shape may be formed by sticking the flexible substrate 8 along the inner surface of the housing 10 without using the support member 5.

As described above, according to the present exemplary embodiment, the end part of the flexible substrate 8 is disposed along the side surface 10d of the housing 10 of the X-ray imaging apparatus 1. Thereby, the photoelectric conversion elements 9 provided on the substrate 8 and the phosphor member 7 stuck on the substrate 8 can be brought close to the side surface 10d of the housing 10. This can prevent breakage of the radiation image detector and reduce defects in a radiation image.

Figure 2:
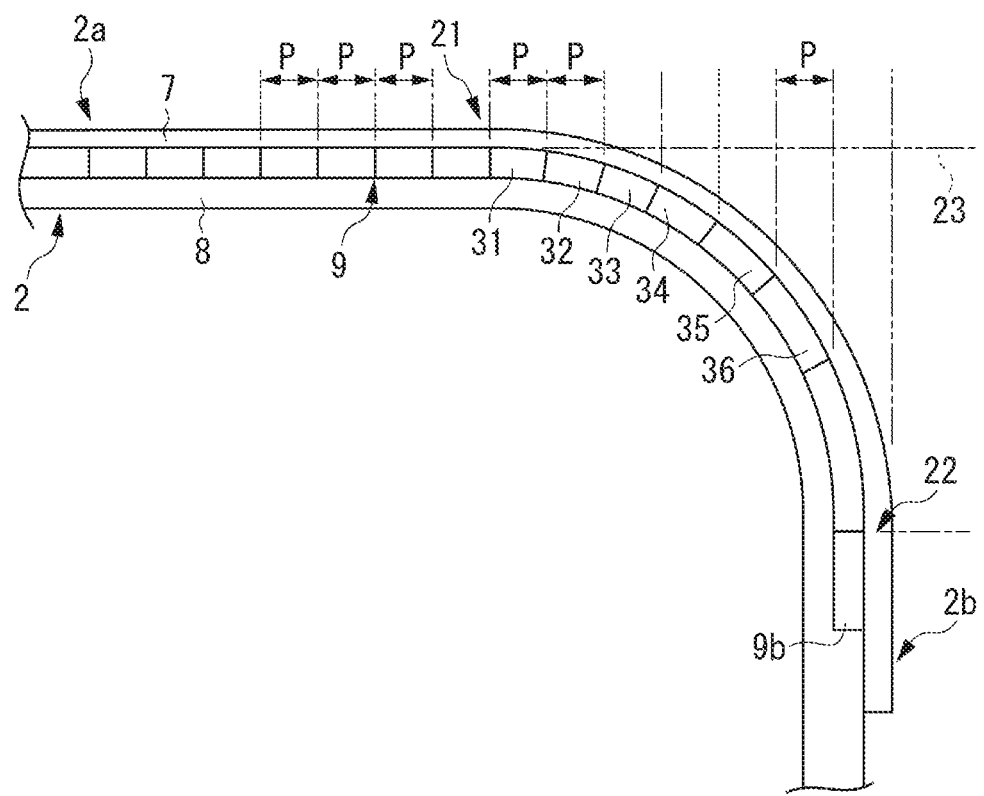
FIG. 2 is a partial sectional view illustrating an example of an X-ray image detector according to a second exemplary embodiment.

FIG. 2 is a partial sectional view illustrating an example of an X-ray image detector 2 according to a second exemplary embodiment. In the present exemplary embodiment, the same members as those in the first exemplary embodiment are represented by the same reference numbers, and thus the detailed descriptions thereof will be omitted.

In the present exemplary embodiment, as in the first exemplary embodiment, a support member 5 supports an X-ray image detector 2 so as to follow an R shape between a central part 2a and end part 2b of the X-ray image detector 2. A phosphor member 7 is stuck on a photoelectric conversion substrate 6 so that an end part 9b of photoelectric conversion elements 9 is covered with the phosphor member 7. Herein, in the present exemplary embodiment, a pixel size P (arrangement pitch) of the photoelectric conversion elements 9 arranged so as to be substantially parallel to a housing lid 10c is different from that of the photoelectric conversion elements 9 located between a starting point 21 and end point 22 of the R shape. Herein, projection of the pixel size of the photoelectric conversion elements 9 arranged in the R shape to an extended line 23 (a long horizontal two-dot chain line in FIG. 2) of a reference line of linear arrangement of the photoelectric conversion elements 9 is equivalent to the pixel size P. More specifically, the pixel sizes of elements 31 to 36 of the photoelectric conversion elements 9 arranged in the R shape are different from each other, and the pixel sizes are increased toward the end point 22 of R shape arrangement of the photoelectric conversion elements 9. The pixel sizes are unambiguously determined based on the pixel size P of the photoelectric conversion elements 9 and the radius of the R shape.

Since an entire photoelectric conversion substrate is planarly disposed in a conventional X-ray imaging apparatus, pixel sizes (arrangement pitches) of photoelectric conversion elements are the same. If the pixel sizes of the photoelectric conversion elements 9 are set on the above-mentioned condition in the present exemplary embodiment, a detection area of an X-ray image by each photoelectric conversion elements 9 arranged in the R shape becomes equivalent to that by the photoelectric conversion elements 9 that is planarly arranged, and thereby an X-ray image of a subject is not distorted.

Figure 3:
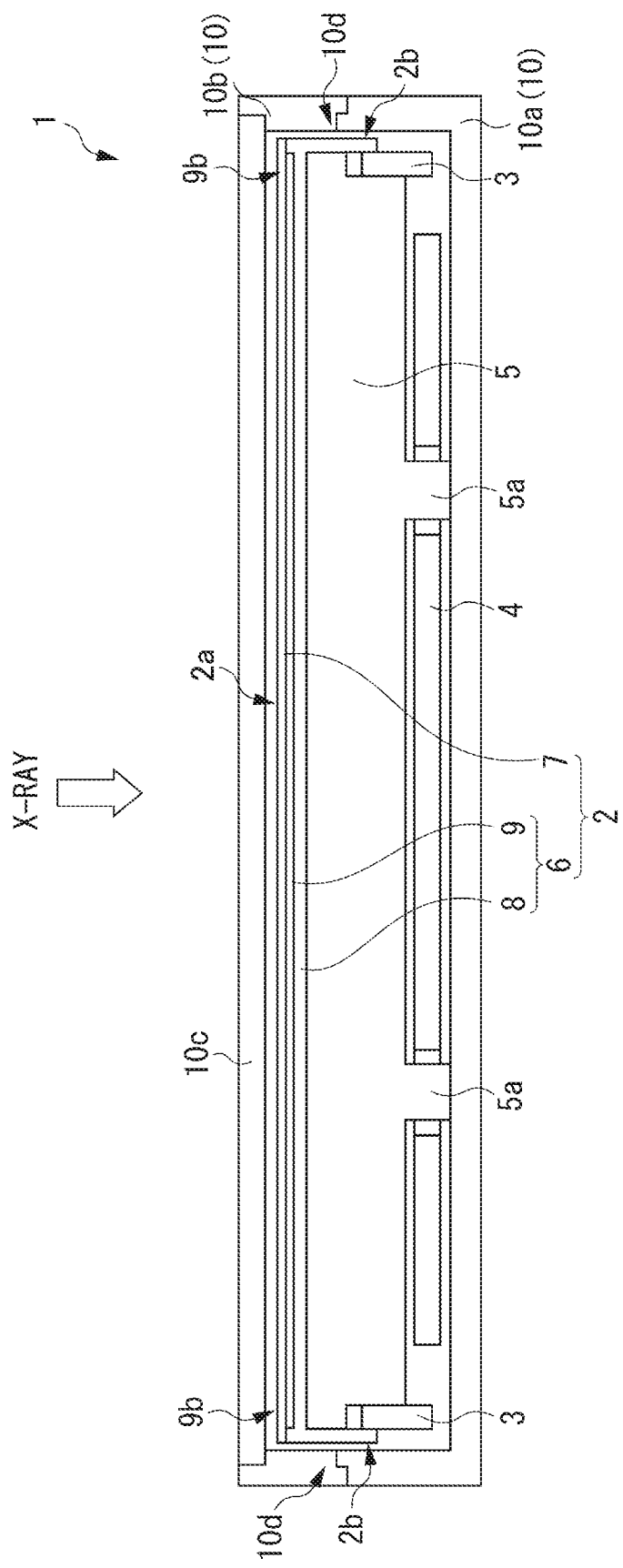
FIG. 3 is a sectional view illustrating an example of an X-ray imaging apparatus according to a third exemplary embodiment.

FIG. 3 is a sectional view illustrating an example of an X-ray imaging apparatus according to a third exemplary embodiment. In the present exemplary embodiment, the same members as those in the first exemplary embodiment are represented by the same reference numbers, and thus the detailed descriptions thereof will be omitted.

In the present exemplary embodiment, a support member 5 supports an X-ray image detector 2 in substantially the same manner as in the first exemplary embodiment. Specifically, the support member 5 has a shape such that a central part 2a of the X-ray image detector 2 is supported so as to be substantially parallel to a housing lid 10c, such that an end part 2b of the X-ray image detector 2 is supported near a side surface 10d of a housing 10, and the end part 2b is supported in a direction substantially perpendicular to the housing lid 10c. Therefore, a substrate 8 is continuously disposed along the side surface 10d of the housing 10 from a surface substantially parallel to the housing lid 10c.

Herein, in the present exemplary embodiment, the substrate 8 is bent downward at an angle of approximately 90 degrees near the side surface 10d of the housing 10. A photoelectric conversion elements 9 provided on the substrate 8 is formed up to near the bending position of the substrate 8. A phosphor member 7 is stuck on a photoelectric conversion substrate 6 so that an end part 9b of the photoelectric conversion elements 9 is covered with the phosphor member 7. More specifically, the phosphor member 7 and the photoelectric conversion elements 9 in the present exemplary embodiment are disposed so as to be substantially parallel to the housing lid 10c. A drive processing circuit substrate 3 and the substrate 8 are directly connected by using, for example, a connector without using a flexible wiring substrate. In this case, a connector provided in at least any one of the drive processing circuit substrate 3 and the substrate 8 corresponds to an example of a connection unit.

Figure 4A:
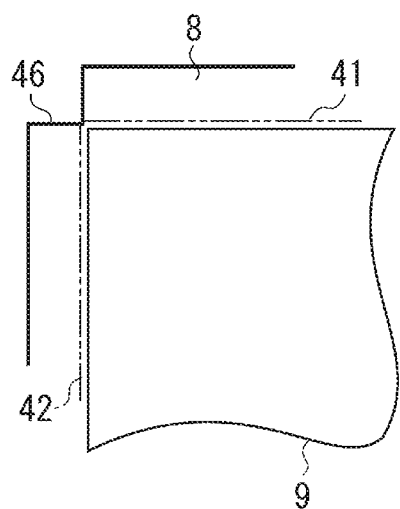
FIGS. 4A and 4B are plan views each illustrating an example of a bending position of a substrate.
Figure 4B:
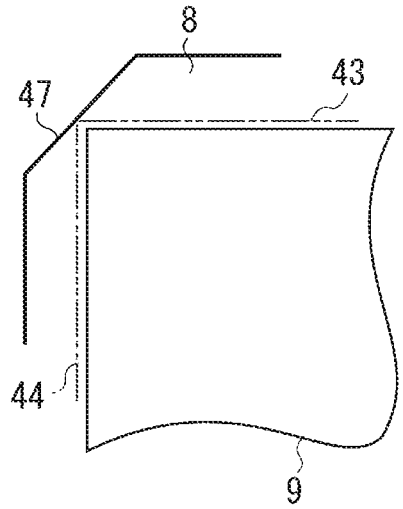

FIGS. 4A and 4B each illustrate an example of the bending position of the substrate 8, and are plan views illustrating a corner part of the photoelectric conversion substrate 6 before bending. A rectangular notch part 46 is formed adjacent to a corner part of the photoelectric conversion elements 9 on the substrate 8 illustrated in FIG. 4A. A linear notch part 47 passing through a substantially corner part of the photoelectric conversion elements 9 is formed on the substrate 8 illustrated in FIG. 4B. The substrate 8 can be disposed along the two side surfaces 10d of the housing 10 adjacent to each other by simultaneously bending at bending lines 41 and 42 (bending lines 43 and 44) of the substrate 8 to the back surface side of a paper plane. Herein, the bending lines 41 to 44 are located near the outer periphery of the photoelectric conversion elements 9 on the outside of the outer periphery.

As described above, since the arrangement of the photoelectric conversion elements 9 located near the side surface 10d of the housing 10 does not take an R shape according to the present exemplary embodiment, distortion of an X-ray image is not generated. Furthermore, all end parts of the four sides of the photoelectric conversion elements 9 provided in the X-ray image detector 2 can be brought close to the four side surfaces 10d of the housing 10 by bending the substrate 8 at an angle of approximately 90 degrees near the four side surfaces 10d of the housing 10.

The exemplary embodiments of the present invention have been described above. However, as a matter of course, the present invention is not limited to the exemplary embodiments described above, and can be variously modified and changed within the gist and scope of the invention. For example, the exemplary embodiments may be combined.

For example, the above-mentioned first exemplary embodiment describes the case where both the phosphor member 7 and the photoelectric conversion elements 9 provided on the substrate 8 are continuously disposed along the side surface 10d of the housing 10 from the surface substantially parallel to the housing lid 10c. However, the combinations of the disposed phosphor member 7 and photoelectric conversion elements 9 are not limited thereto. Specifically, as illustrated in FIG. 5, only any one of the phosphor member 7 and the photoelectric conversion elements 9 may be disposed so as to be substantially parallel to the housing lid 10c, and the other may be disposed along the side surface 10d of the housing 10. FIG. 5 illustrates an example in which only the phosphor member 7 is disposed along the side surface 10d of the housing 10 on the left, and an example in which only the photoelectric conversion elements 9 is disposed along the side surface 10d of the housing 10 on the right.

Figure 6:
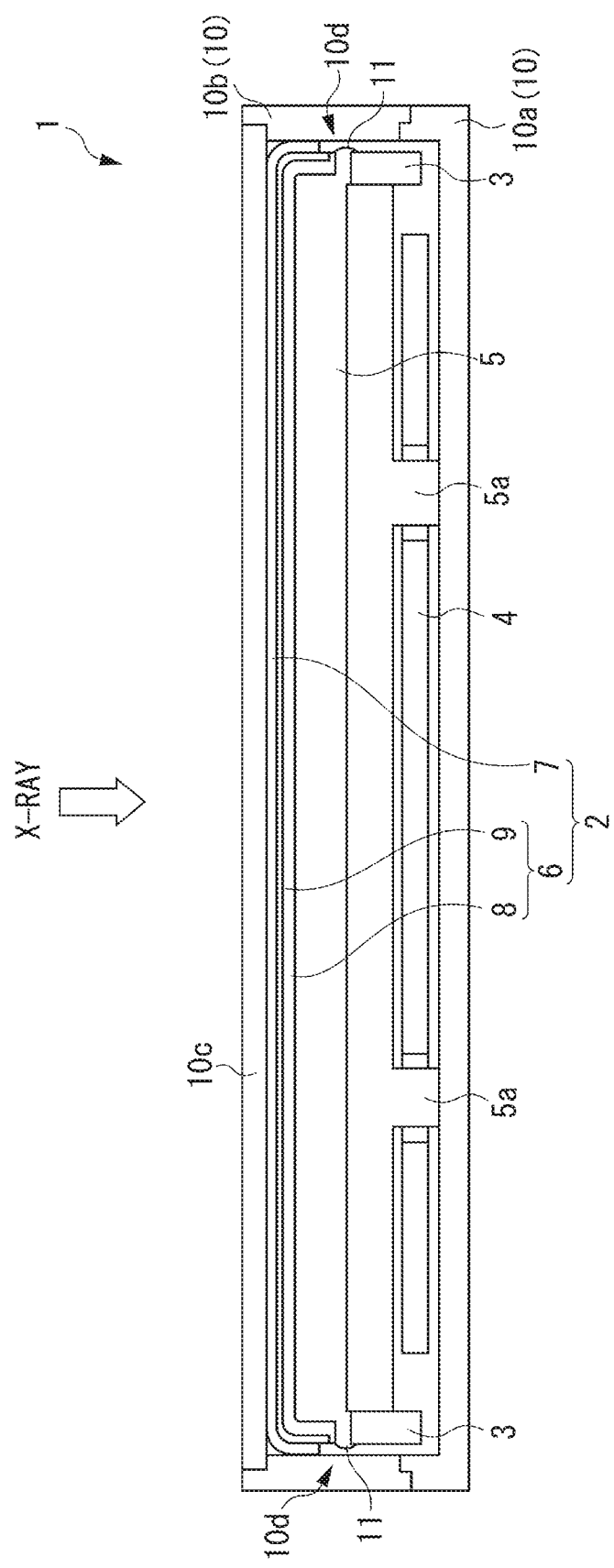
FIG. 6 is a sectional view illustrating an example of an X-ray imaging apparatus of another exemplary embodiment.

The above-mentioned embodiment describes the case where the support member 5 is disposed in the housing 10. However, the support member is not limited to such a form. For example, as illustrated in FIG. 6, the support member 5 may be used only for the purpose of fixing the drive processing circuit substrate 3 and the signal processing circuit substrate 4, and the X-ray image detector 2 including the substrate 8 may be supported by using the upper housing 10b and the housing lid 10c. Therefore, in FIG. 6, the upper housing 10b and the housing lid 10c are configured as the support member. In this case, the phosphor member 7 is fixed to the upper housing 10b and the housing lid 10c by using an adhesion. This configuration can bring the photoelectric conversion elements 9 and the phosphor member 7 closer to the side surface 10d of the housing 10.

Figure 7:
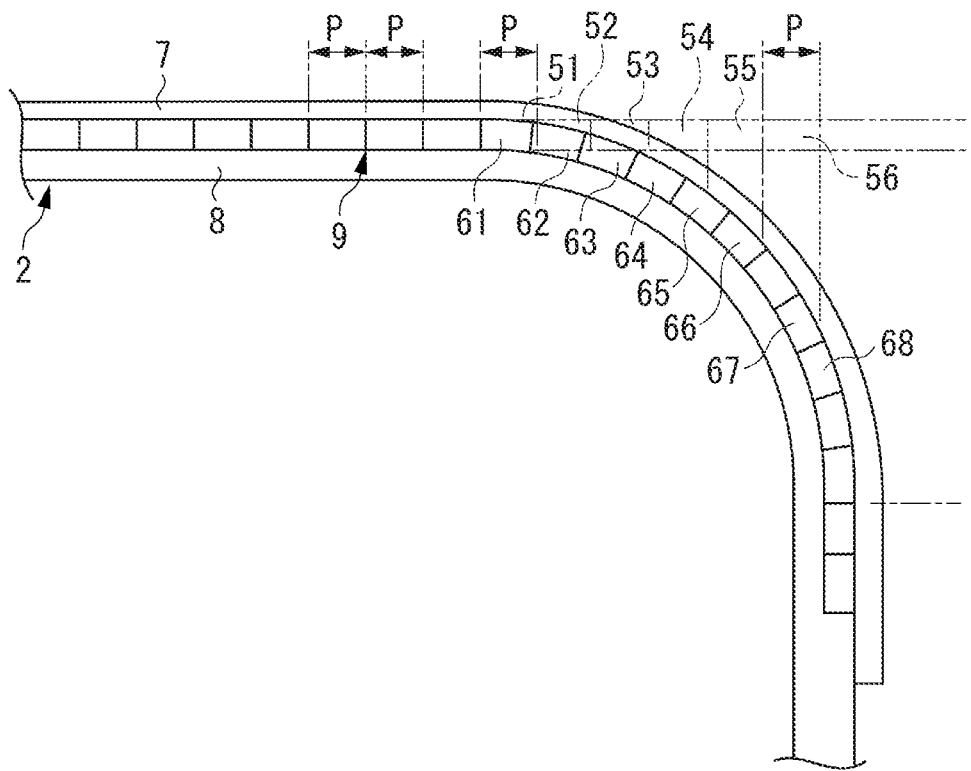
FIG. 7 illustrates a concept of performing geometrical correction processing on the distortion of an X-ray image.

The above-mentioned second exemplary embodiment describes the case where a portion in which the arrangement of the photoelectric conversion elements 9 is not on the same plane, i.e., the distortion of the X-ray image detected by the photoelectric conversion elements 9 arranged in the R shape is solved by the correction due to the partial change in the pixel size. However, the correction method is not limited thereto. For example, as illustrated in FIG. 7, in the signal processing circuit substrate 4, the electric signal output from each photoelectric conversion elements 9 arranged in the R shape is subjected to geometric correction processing based on the radius of the R shape. An electric signal which is equivalent to an apparent pixel (the two-dot chain line in FIG. 2) may be set by reconfiguration according to the correction processing. Specifically, the signal processing circuit substrate 4 reconfigures an electric signal equivalent to an apparent pixel 51 using electric signals of actual photoelectric conversion elements 61 and 62. Similarly, an apparent pixel 52, an apparent pixel 53, an apparent pixel 54, and an apparent pixel 56 may be reconfigured by respectively using actual photoelectric conversion elements 62 and 63, actual photoelectric conversion elements 63 and 64, actual photoelectric conversion elements 64 and 65, and actual photoelectric conversion elements 66 to 68. In this case, the signal processing circuit substrate 4 supports an example of a signal processing unit.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-164983 filed Jul. 25, 2012, which is hereby incorporated by reference herein in its entirety.

What is claimed is:

1. A radiation imaging apparatus comprising:
a radiation image detection unit including a flexible substrate, photoelectric conversion elements arranged on the substrate, and a phosphor member disposed on an upper part of the substrate;
a housing accommodating the radiation image detection unit; and
a support member including the substrate disposed along a side surface for non-radiation transmission in the housing from a surface for radiation transmission in the housing.

2. The radiation imaging apparatus according to claim 1, wherein at least any one of the photoelectric conversion elements and the phosphor is disposed along the side surface for non-radiation transmission in the housing from the surface for radiation transmission in the housing.

3. The radiation imaging apparatus according to claim 1, wherein the support member is the surface for radiation transmission in the housing and the side surface for non-radiation transmission in the housing.

4. The radiation imaging apparatus according to claim 1, wherein the substrate is bent near the side surface in the housing.

5. The radiation imaging apparatus according to claim 1, further comprising a circuit substrate configured to drive the radiation image detection unit, and a connection unit configured to connect the substrate and the circuit substrate, wherein the connection unit is connected to an end part of the substrate.

6. The radiation imaging apparatus according to claim 1, further comprising a circuit substrate configured to drive the radiation image detection unit, and a connection unit configured to connect the substrate and the circuit substrate, wherein the connection unit is provided in the substrate, and the substrate is directly connected to the circuit substrate.

7. The radiation imaging apparatus according to claim 1, wherein a pixel size of the photoelectric conversion elements located near the side surface of the housing is set based on a shape of the substrate.

8. The radiation imaging apparatus according to claim 1, further comprising a signal processing unit configured to perform geometric correction processing on an image signal output from the photoelectric conversion elements based on a shape of the substrate to reconfigure the image signal.

* * * * *